(12) United States Patent
Segall

(10) Patent No.: US 7,438,304 B2
(45) Date of Patent: Oct. 21, 2008

(54) VEHICLE MOUNT/DISMOUNT SYSTEM

(76) Inventor: Stuart C. Segall, 2644 Hidden Valley Rd., La Jolla, CA (US) 92037

( * ) Notice: Subject to any disclaimer, the term of this patent is extended or adjusted under 35 U.S.C. 154(b) by 570 days.

(21) Appl. No.: 11/167,565

(22) Filed: Jun. 27, 2005

(65) Prior Publication Data

US 2006/0290092 A1 Dec. 28, 2006

(51) Int. Cl.
*B60R 3/00* (2006.01)

(52) U.S. Cl. .................. 280/163; 280/164.1; 280/166; 296/62; 182/127

(58) Field of Classification Search .......... 280/163, 280/164.1, 166; 296/62; 182/127
See application file for complete search history.

(56) References Cited

U.S. PATENT DOCUMENTS

| | | | | |
|---|---|---|---|---|
| 2,957,541 | A * | 10/1960 | Everest et al. | 182/115 |
| 4,185,716 | A * | 1/1980 | Rinehart | 182/2.5 |
| 4,193,477 | A * | 3/1980 | Broyles | 182/194 |
| 4,371,056 | A * | 2/1983 | Anglade | 182/127 |
| 4,431,082 | A * | 2/1984 | Bott | 182/127 |
| 5,033,582 | A * | 7/1991 | Hoben | 182/85 |
| 5,046,582 | A * | 9/1991 | Albrecht | 182/127 |
| 5,064,023 | A * | 11/1991 | Loeber | 182/90 |
| 5,205,603 | A * | 4/1993 | Burdette, Jr. | 296/62 |
| 5,813,494 | A * | 9/1998 | Ulschmid et al. | 182/97 |
| 6,378,654 | B1 * | 4/2002 | Ziaylek et al. | 182/97 |
| 6,394,229 | B1 * | 5/2002 | Hastreiter | 182/107 |
| 6,425,572 | B1 * | 7/2002 | Lehr | 256/1 |
| 6,640,929 | B2 * | 11/2003 | Korpi | 182/127 |
| 6,739,349 | B2 * | 5/2004 | Kastenschmidt et al. | 137/15.16 |
| 7,007,366 | B1 * | 3/2006 | Eby | 29/436 |
| 2003/0020253 | A1 * | 1/2003 | Bosman et al. | 280/164.1 |
| 2003/0071434 | A1 * | 4/2003 | Budd | 280/166 |
| 2004/0069566 | A1 * | 4/2004 | Bareket | 182/97 |

* cited by examiner

*Primary Examiner*—Christopher Ellis
*Assistant Examiner*—Katy Meyer
(74) *Attorney, Agent, or Firm*—Nydegger & Associates

(57) ABSTRACT

A mount/dismount system for use with a personnel carrier (vehicle) having a substantially flat bed, includes a tubular frame and attachments for holding the frame on the vehicle. Specifically, the tubular frame includes a grip pole that extends perpendicularly from the vehicle bed. It also includes a cross bar that interconnects, and is coplanar with, the grip pole and a support pole. When the frame is attached to the vehicle, the support pole is positioned at a distance "d" from the bed of the vehicle. Additionally, the support pole incorporates a step for concerted use with the grip pole and the support pole by personnel as they mount/dismount the vehicle.

17 Claims, 1 Drawing Sheet

VEHICLE MOUNT/DISMOUNT SYSTEM

FIELD OF THE INVENTION

The present invention pertains generally to troop transport vehicles. More particularly, the present invention pertains to systems that facilitate the rapid mounting and dismounting of a vehicle, such as a 7-ton truck. The present invention is particularly, but not exclusively, useful as a system for mounting and dismounting a vehicle, when such activity requires combat-equipped personnel to negotiate a vertical distance that may be greater than approximately five or six feet.

BACKGROUND OF THE INVENTION

The ability of personnel to quickly mount or dismount a vehicle involves several factors that are generally dependent on both the configuration of the vehicle, and the agility of the person that is mounting or dismounting the vehicle. In the particular case wherein the vehicle is a military truck, the primary configuration factor is the vertical distance that must be negotiated by personnel to mount or dismount the truck. For instance, a 7-ton military truck, with its tailgate down, presents a vertical drop from the bed of the truck to the ground that can be as much a five feet, or more. Couple this with the fact that in a military situation, where speed of movement is critical, the agility of personnel in a mount/dismount procedure will be impeded by the fact they may be required to carry in excess of fifty pounds of equipment. Stated succinctly, combat-loaded military personnel can experience great difficulty in mounting or dismounting a vehicle, such as a 7-ton truck, unless they are somehow provided the proper support to do so.

As is well known, and clearly obvious, a person's agility is severely tested whenever they attempt to negotiate a vertical distance that is greater than about three or four feet. In this context, consider that the vertical distance presented by a typical step in a staircase is only about six inches. Further, staircases typically include a banister for support. On the other hand, whenever much greater vertical distances need to be directly negotiated, other types of structural support may be necessary. For example, in a firehouse where firemen must quickly and safely descend from a second floor to a ground floor in a matter of only a few seconds, staircases are considered inadequate and cumbersome. Instead, poles are used. For military operations, where trucks are used to variously haul personnel, or cargo, or both personnel and cargo, it is necessary to provide a structural support system that will assist personnel to quickly mount/dismount the vehicle, when needed. At the same time, it is important to maintain the versatility of the vehicle for its other missions.

In light of the above, it is an object of the present invention to provide a mount/dismount system for use on a vehicle (e.g. a truck) that can be quickly and easily installed on the vehicle, as well as quickly and easily removed therefrom. Another object of the present invention is to provide a mount/dismount system for a vehicle which allows combat-loaded personnel to quickly and safely mount/dismount the vehicle. Yet another object of the present invention is to provide a mount/dismount system for a vehicle that is easy to use, simple to install, and comparatively cost effective.

SUMMARY OF THE INVENTION

In accordance with the present invention, a mount/dismount system for a troop personnel carrier is provided. More specifically, the present invention is directed toward the use of such a system with a vehicle (i.e. a 7-ton truck), that has a substantially flat bed for transporting personnel (e.g. combat-equipped troops). In particular, the system is intended to facilitate the mounting and dismounting of such a vehicle under conditions that require personnel with their equipment to negotiate a vertical distance that may be greater than five or six feet.

Structurally, the system of the present invention includes a pair of tubular frames that are attached, in combination, to the rear end of the vehicle. Individually, each frame includes both a grip pole and a support pole. Each frame also includes a cross bar that interconnects the grip pole with the support pole. With this interconnection, each frame (i.e. the grip pole, cross bar and support pole) lies substantially in a plane.

When a frame is attached to a vehicle, its grip pole will be oriented substantially perpendicular to the bed of the vehicle. The plane of the frame is therefore also oriented perpendicular to the bed of the vehicle. Further, when a plurality of frames is attached to the vehicle, the planes of the respective frames are substantially parallel to each other. Preferably, these planes are also parallel to a longitudinal axis of the vehicle.

As envisioned for the present invention, an attachment component will be used for connecting the grip pole of each frame to the bed of the vehicle. Additionally, an engagement component will be used for fixedly holding the support pole, and thus the frame, on the vehicle. Importantly, as indicated above, these connections will hold the grip pole perpendicular to the bed of the vehicle. At the same time, they will also position the support pole at a distance "d" from the bed of the vehicle, behind the vehicle. In more detail, the attachment component, which is used to connect grip poles to the bed of the vehicle, has a base plate with a pair of stanchions that extend, in parallel, from the base plate. This attachment component also includes a tie down device that is mounted on the base plate for engagement with the bed of the vehicle, to hold the base plate on the bed. The grip poles can then be connected to respective stanchions.

As envisioned by the present invention, the system also includes a step that is attached to an end of the support pole, at a location below the bed of the vehicle. When a plurality of frames is employed, the step extends between the frames, and is substantially perpendicular to the plane of the frames. As also envisioned by the present invention, the vehicle may include a substantially rectangular shaped tailgate that has sides of a length "l" and ends of a width "w". If so, one side of the tailgate will typically be attached, by hinges, to the rear edge of the bed of the vehicle. This allows for rotation of the tailgate about the hinge-line. In this case, however, the width "w" of the tailgate needs to be less than the distance "d" between the rear edge of the vehicle bed and the support pole. Further, when the vehicle has such a tailgate, the system can include a footrest that is attached to the tailgate for cooperation with the step during a mount/dismount procedure. With or without a footrest, the present invention provides for concerted use of the grip poles, the support poles and the step by a person during his/her mount/dismount of the vehicle.

Variations in the system of the present invention can be provided by selectively inclining the support pole. Specifically, the support pole can be inclined at an angle to the bed of the vehicle to assist a person during a mount/dismount of the vehicle. Preferably, the incline angle is in a range between approximately zero degrees and twenty degrees, from vertical.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
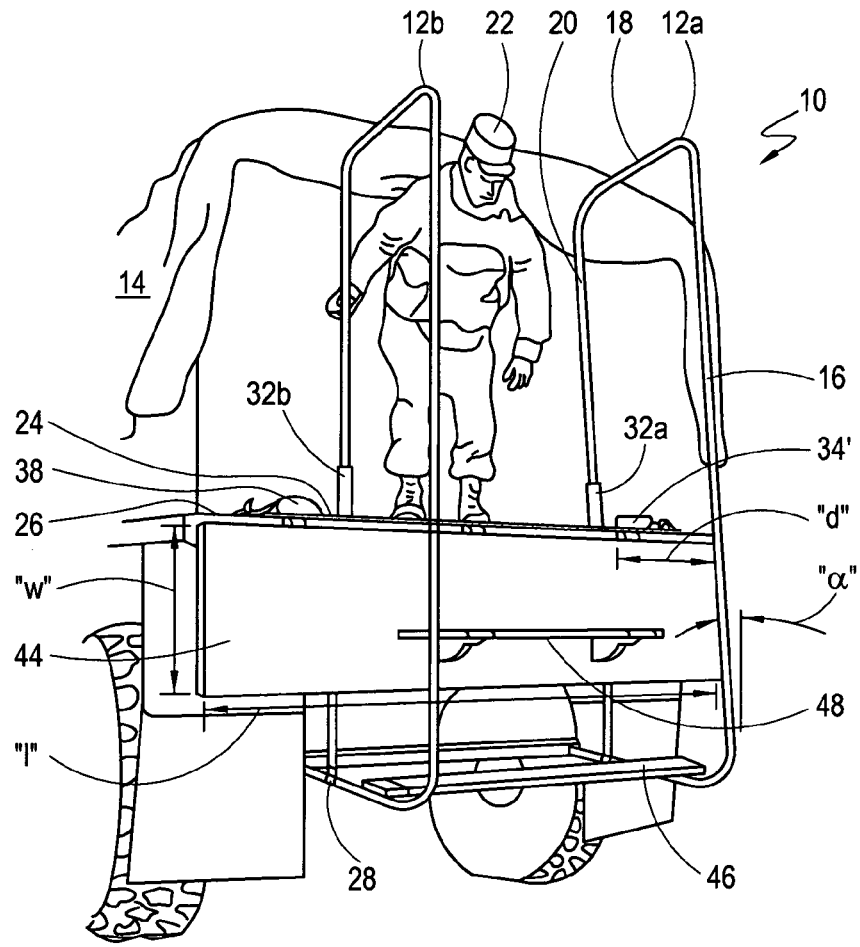
FIG. 1 is a perspective view of the mount/dismount system of the present invention affixed to the back end of a vehicle.

Referring initially to FIG. 1, a vehicle mount/dismount system in accordance with the present invention is shown and is generally designated 10. As shown, the system 10 includes a plurality of frames 12a and 12b that are attached or affixed to the rear end of a vehicle 14. Although two frames 12a,b are shown in FIG. 1, this is only exemplary. It is to be appreciated that, depending on the configuration and type of vehicle 14 that is used, only one such frame 12, or more than two frames 12 can be employed. For purposes of discussion here, the vehicle 14 is considered to be a 7-ton military truck. Also, with the understanding that all frames 12 are substantially identical, the discussion here makes specific reference to the frame 12a.

In detail, the frame 12a includes a support pole 16, that is connected to a cross bar 18 which, in turn, is connected to a grip pole 20. Together, the support pole 16, cross bar 18 and grip pole 20 are contiguously interconnected to comprise the frame 12. Further, as seen in FIG. 1, these components are all substantially in a same plane. Also, as intended for the present invention, the support pole 16, cross bar 18 and grip pole 20 are all formed from a single, unitary, tubular-shaped pipe that has an outer diameter which will allow a person 22 to grip or grasp the frame 12 with his/her hands.

Figure 2:
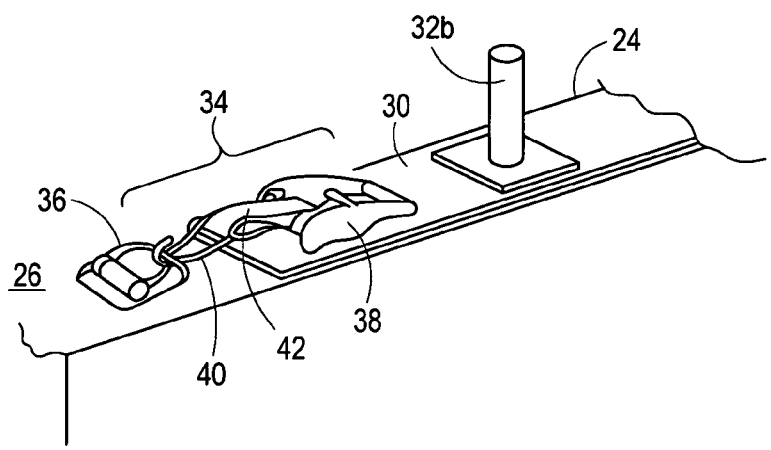
FIG. 2 is a perspective view of a portion of the attachment component of the mount/dismount system showing its engagement with the bed of the vehicle.

FIG. 1 also shows that one end of the frame 12 is engaged with an attachment component 24 that is secured to the bed 26 of the vehicle 14, and that the other end of the frame 12 is engaged with an engagement component 28 that is part of the frame of vehicle 14. In detail, the attachment component 24 will be best appreciated with reference to FIG. 2. There it will be seen that the attachment component 24 includes a base plate 30 with at least one stanchion 32 that is positioned to extend perpendicularly from the base plate 30. As will be appreciated, the number of stanchions 32 that are to be used with the attachment component 24 will depend on the number of frames 12 that are to be incorporated into the system 10. Accordingly, for the discussion here, stanchions 32a,b are shown for use with frames 12a,b, respectively. Further, it will be seen that the attachment component 24 includes a tie-down device 34 that involves a D-ring 36 and a tensioner 38. Specifically, the D-ring 36 is directly connected to the bed 26 of the vehicle 14, and the tensioner 38 is fixed to the base plate 30 of the attachment component 24. As shown, the tensioner 38 also includes a hook 40 and a strap 42. With this combination, the hook 40 can be engaged with the D-ring 36, and the tensioner 38 can be manipulated to pull on the strap 42. Similarly, a tie down device 34' can be used at the other end of the attachment component 24 (see FIG. 1). The consequence is that the attachment component 24 is then secured against the bed 26 of the vehicle 14. The frame(s) 12 can then be positioned on the vehicle 14.

To position a frame 12 on the vehicle 14, the grip pole 20, at the end of frame 12, is inserted into a stanchion 32. Also, as shown, the support pole 16 is attached to the engagement component 28 of the vehicle 14. This can be done in any manner well known in the pertinent art. With the support pole 16 connected to the engagement component 28, the attachment component 24 is then placed on the bed 26 of the vehicle 14. The tie down devices 34 and 34' can then be manipulated to secure the attachment component 24 to the bed 26, as disclosed above.

Once the frame(s) 12 of the system 10 have been positioned on the vehicle 14, as shown, the respective planes of the frame(s) 12 will be substantially parallel to each other. Also, the grip pole(s) 20 will be oriented substantially perpendicular to the bed 26 of the vehicle 14, and the support pole(s) 16 will be oriented at an angle "α" from vertical. Preferably, the angle "α" will be in a range between zero degrees and twenty degrees, with an incline toward the vehicle 14 at the top of the support pole 16. Importantly, when the frame 12 is positioned on the vehicle 14, the support pole 16 will be at least at a distance "d" from the bed 26 of the truck 14. This is so, in order to allow the hinged tailgate 44 of the vehicle 14 to be raised and lowered. Accordingly, for a substantially rectangular shaped tailgate 44 having a length "l" and a width "w", it is necessary that "w" be less than the distance "d".

Still referring to FIG. 1, it will be seen that a step 46 and a footrest 48 can be provided for the system 10. Specifically, the step 46 is provided at the bottom of the support pole 16, and can extend between the frames 12. Thus, when a plurality of poles (16) is used, the step 46 will extend from one support pole 16 to another support pole 16. Further, the footrest 48 can be fastened to the tailgate 44, as shown, by any means well known in the art. As envisioned by the present invention, the vertical distance between the bed 26 and the footrest 48 will be approximately 2 feet, more or less. Likewise, the respective vertical distances between the footrest 48 and the step 46, as well as between the step 46 and the ground, will also be around 2 feet. Consequently, a person 22 is able to use the grip pole 20 and the support pole 16 of the frame(s) 12, in concert with the footrest 48 and the step 46, to easily mount and dismount the vehicle 14

While the particular Vehicle Mount/Dismount System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mount/dismount system for a vehicle, wherein the vehicle has a substantially flat bed for transporting personnel, said system comprising:

a tubular frame, said tubular frame having a first end and a second end with a substantially straight support pole extending therebetween; and an attachment component for connecting the first end of said frame to the bed of the vehicle to orient the support pole in a plane, wherein the plane is substantially perpendicular to the bed of the vehicle, and wherein the support pole is positioned at a distance "d" from the bed of the vehicle and is inclined at an angle to the bed of the vehicle to assist a person during a mount/dismount of the vehicle and the vehicle includes a substantially rectangular shaped tailgate having sides of a length "l" and ends of a width "w", and wherein one side of the tailgate is hingedly attached to the bed of the vehicle between said grip pole and said support pole, and further wherein w<d.

2. A system as recited in claim 1 wherein the first end of said tubular frame further comprises:
a tubular grip pole connected to the bed of the vehicle with said grip pole extending from the bed of the vehicle and oriented substantially perpendicular thereto; and
a cross bar interconnecting said grip pole with said support pole to hold said support pole substantially coplanar with said grip pole.

3. A system as recited in claim 2 further comprising a step attached to the second end of said support pole for concerted use of said grip pole, said support pole and said step by a person during the mount/dismount of the vehicle.

4. A system as recited in claim 2 further comprising:
a plurality of said frames; and
a step attached to the respective second end of each said support pole for concerted use of said grip poles, said support poles and said step by a person during the mount/dismount of the vehicle.

5. A system as recited in claim 2 wherein the incline angle of said support pole to the bed of the vehicle is in a range between approximately zero degrees and twenty degrees.

6. A system as recited in claim 2 wherein each frame defines a plane and the planes of the respective frames are substantially, mutually parallel to each other.

7. A system as recited in claim 1 further comprising a footrest attached to said tailgate for cooperation with said step during mount/dismount.

8. A system as recited in claim 1 further comprising an engagement component mounted on the vehicle for fixedly holding the second end of said frame.

9. A mount/dismount system for a vehicle, wherein the vehicle has a substantially flat bed for transporting personnel, said system comprising:
a tubular grip pole connected to the bed of the vehicle with said grip pole being oriented substantially perpendicular to the bed of the vehicle;
a tubular support pole, said support pole having a first end and a second end;
a cross bar interconnecting said grip pole with the first end of said support pole to hold said support pole at a distance "d" from the bed of the vehicle, and to hold said support pole substantially coplanar with said grip pole, wherein the vehicle includes a substantially rectangular shaped tailgate having sides of a length "l" and ends of a width "w", and wherein one side of the tailgate is hingedly attached to the bed of the vehicle between said grip pole and said support pole, and further wherein w<d; and
a step attached to the second end of said support pole for concerted use of said grip pole, said support pole and said step by a person during a mount/dismount of the vehicle.

10. A system as recited in claim 9 wherein said grip pole, said support pole and said cross bar comprise a frame, and said system further comprises a plurality of said frames wherein each frame defines a plane and the planes of the respective frames are substantially, mutually parallel to each other.

11. A system as recited in claim 9 wherein said step is attached to the respective second end of each said support pole for concerted use of said grip poles, said support poles and said step by a person during the mount/dismount of the vehicle.

12. A system as recited in claim 9 wherein said support pole is inclined at an angle to the bed of the vehicle and the incline angle is in a range between approximately zero degrees and twenty degrees.

13. A system as recited in claim 9 further comprising a footrest attached to said tailgate for cooperation with said step during mount/dismount.

14. A system as recited in claim 9 further comprising:
an attachment component for connecting said grip pole to the bed of the vehicle; and
an engagement component for fixedly holding the second end of said support pole on the vehicle.

15. A method for modifying a vehicle to incorporate a mount/dismount system, said method comprising the steps of:
providing a frame and an attachment component, wherein the frame includes a cross bar for holding a grip pole substantially coplanar with a support pole, and wherein the attachment component includes a base plate with a stanchion extending therefrom and a tie down device mounted thereon;
connecting the grip pole to the stanchion of the attachment component;
engaging the support pole to the vehicle; and
securing the tie down device of the attachment component to the bed of the vehicle to position the support pole at a distance "d" from the bed of the vehicle to assist a person during a mount/dismount of the vehicle, and wherein the vehicle includes a substantially rectangular shaped tailgate having sides of a length "l" and ends of a width "w", and wherein one side of the tailgate is hingedly attached to the bed of the vehicle between said grip pole and said support pole and further wherein w<d and a footrest is attached to said tailgate for cooperation with said step during mount/dismount.

16. A method as recited in claim 15 further comprising the step of attaching a step to the frame for concerted use of the grip pole, the support pole and the step by a person during a mount/dismount of the vehicle.

17. A method as recited in claim 15 wherein the providing step involves a plurality of frames and an attachment component having a plurality of stanchions, and wherein said method further comprises the step of repeating the connecting step and the engaging step for each frame and a respective stanchion.

* * * * *